(No Model.)
A. W. ROLFE.
SHAFTING AND PULLEY.
No. 370,416. Patented Sept. 27, 1887.
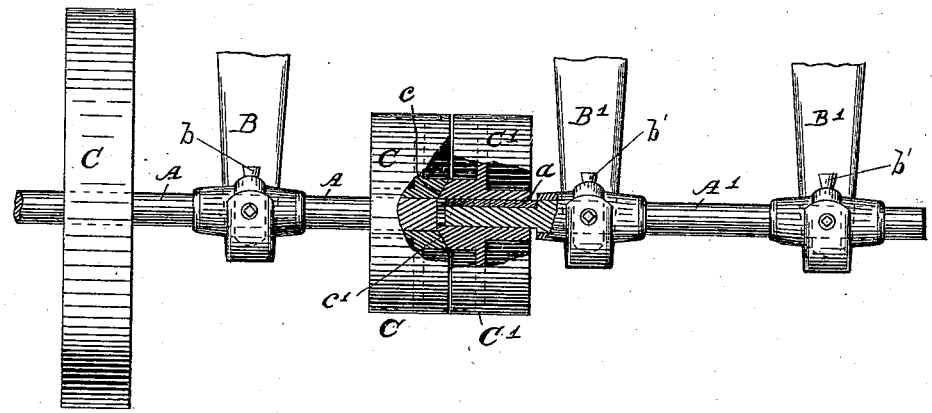
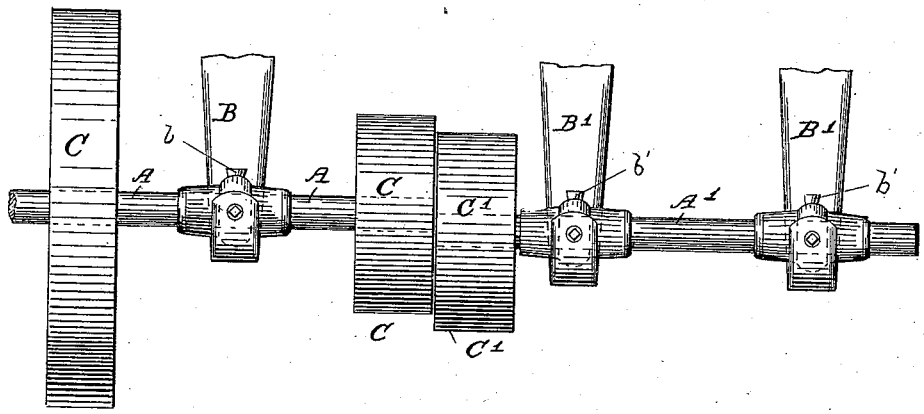

UNITED STATES PATENT OFFICE.

ABIAL W. ROLFE, OF PENACOOK, NEW HAMPSHIRE.

SHAFTING AND PULLEY.

SPECIFICATION forming part of Letters Patent No. 370,416, dated September 27, 1887.

Application filed March 2, 1887. Serial No. 229,393. (No model.)

*To all whom it may concern:*

Be it known that I, ABIAL W. ROLFE, a citizen of the United States, residing at Penacook, in the county of Merrimac and State of New Hampshire, have invented certain new and useful Improvements in Shafting and Pulleys, of which the following is a specification.

The object of this invention is to provide a convenient substitute for the ordinary loose pulley, by the use of which much time and labor will be saved in cleaning and lubricating, less lubricant will be necessary, and the tension of the belt diminished when removed from pulley or main shaft. These results are attained by the various devices illustrated in the accompanying drawings, forming part of this specification, of which—

Figure 1 represents a sectional elevation of two pieces of shafting hung in line, and each having a belt-pulley at their adjacent ends, and other details to be hereinafter explained. Fig. 2 is a similar view in which the shafts are hung out of line.

Heretofore, when independent shafts have been used to carry an idle-pulley, one end of the said independent shaft has found its bearing either in the adjacent portion of the hub of driving-pulley on main shaft, said main shaft being placed but part way through the hub of said pulley for this reason, or a collar has been introduced between the hubs of the pulleys, one end being secured by set-screw or otherwise to the main shaft, and the other adapted to receive one end of an independent shaft, and thus serve as its bearing for that end. Either of these methods require as much care in the matter of oiling and keeping clean as do the ordinary loose pulleys.

In my improved independent shaft and idle-pulley I overcome the foregoing difficulties by hanging my independent shaft entirely independent from the driving-shaft, and to insure firmness two hangers may be used to sustain it.

In the drawings, A represents the main or driving shaft, and A' the independent shaft, supported, respectively, by hangers B B'. Driving-pulleys C are shown on the shaft A, and an idle-pulley, C', on the independent shaft A'. The idle-pulley C' adjacent to the driving-pulley is loosely splined to its shaft, as at a, in order that it may have an eighth of an inch (more or less) longitudinal movement upon its shaft while yet revolving therewith, and that end of its hub nearest to the driving-pulley C is of somewhat larger diameter than the other, and formed concave, as at c', while the adjacent surface of the hub of pulley C is convexed, as at c, and either one or the other of these enlarged ends of the hubs of either pulleys C C' is made to project slightly beyond the plane of the rim, or edge of rim, in order that the hubs only may come in contact. Thus, when the driving-belt is upon the idle-pulley C' and the shifter is applied to throw it upon the driving-pulley, the first result is to throw the concaved and convexed surfaces of the hubs of the pulleys in contact, the friction of which starts the independent shaft and pulley revolving, even before the belt has come in contact with the driving-pulley. With this method of placing an idle-pulley upon an independent shaft provided with one or more hangers it is as easily taken care of as is the main shaft and driving-pulleys, as the hangers B' may be supplied with oil-cups b', as is the hanger B with oil-cup b, and said idle-pulley never requires bushing in consequence of wear. Another advantage of providing an idle-pulley with an independent shaft is that said shaft may be placed out of line with the driving-shaft and nearer the counter-shaft or machine to be driven, thus lessening the tension on the belt, wear, friction, and expenditure of power, as in Fig. 2, where the machine to be driven is supposed to be underneath or below the line of shafting, and in which view the independent shaft A' is shown hung lower than the driving-shaft A, both pulleys C C' being the same diameter. In practice the belt will readily climb upon the pulley C from pulley C' when it is desired to shift on the power.

Having described my invention, what I claim, and desire to secure by Letters Patent, is—

1. The combination, with the main shaft and driving-pulley, of an independent loose shaft, and a pulley mounted on the latter in proximity to the driving-pulley, and longitudinally movable relative to the latter, whereby the belt in shifting to the driving-pulley may carry the longitudinally-movable pulley into frictional contact with the driving-pulley, substantially as and for the purpose described.

2. The combination, with the main shaft and driving-pulley, of an independent loose shaft situated slightly out of line with the main shaft, as described, and a pulley on the loose shaft of substantially the same size as the former pulley and situated in proximity thereto, whereby the tension of the belt is changed by shifting it from one pulley to the other, substantially as and for the purpose set forth.

In testimony whereof I affix my signature in presence of two witnesses.

ABIAL W. ROLFE.

Witnesses:
 J. B. THURSTON,
 CHAS. G. REMICK.